(12) United States Patent
Ju et al.

(10) Patent No.: US 7,012,789 B2
(45) Date of Patent: Mar. 14, 2006

(54) COMPOSITE SHARED POLE DESIGN FOR MAGNETORESISTIVE MERGED HEADS

(75) Inventors: Kochan Ju, Fremont, CA (US);
Cherng-Chyi Han, San Jose, CA (US);
Po-Kang Wang, San Jose, CA (US);
Mao-Min Chen, San Jose, CA (US);
Chun Liu, Fremont, CA (US); Jei Wei Chang, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 30 days.

(21) Appl. No.: 10/131,675

(22) Filed: Apr. 24, 2002

(65) Prior Publication Data

US 2002/0159200 A1 Oct. 31, 2002

Related U.S. Application Data

(62) Division of application No. 09/283,840, filed on Apr. 1, 1999, now Pat. No. 6,393,692.

(51) Int. Cl.
*G11B 5/127* (2006.01)
(52) U.S. Cl. .................................................. 360/317
(58) Field of Classification Search ................ 360/317, 360/126
See application file for complete search history.

(56) References Cited

U.S. PATENT DOCUMENTS

| 4,970,615 A | * | 11/1990 | Gau ............................. 360/122 |
| 5,435,053 A | | 7/1995 | Krounbi et al. ............... 29/603 |
| 5,606,478 A | | 2/1997 | Chen et al. ................... 360/126 |
| 5,639,509 A | | 6/1997 | Schemmel .................... 427/130 |
| 5,812,350 A | | 9/1998 | Chen et al. ................... 360/126 |
| 5,949,625 A | * | 9/1999 | Sato et al. .................... 360/122 |
| 6,047,462 A | * | 4/2000 | Miyauchi et al. ........ 29/603.14 |

* cited by examiner

*Primary Examiner*—Angel Castro
(74) *Attorney, Agent, or Firm*—George O. Saile; Stephen B. Ackerman; Graham S. Jones, II (57) ABSTRACT

A merged read/write magnetic recording head comprises a low magnetic moment first magnetic shield layer over a substrate. A read gap layer with a magnetoresistive head is formed over the first shield layer. A shared pole comprises a low magnetic moment second magnetic shield layer plated on a sputtered seed PLM layer over the read gap layer, a non-magnetic layer plated over the PLM layer and a HMM lower pole layer plated over the second magnetic shield layer. A write gap layer is formed over the first high magnetic moment pole layer of the shared pole. An upper pole comprises a high magnetic moment pole layer over the write gap layer.

14 Claims, 8 Drawing Sheets

COMPOSITE SHARED POLE DESIGN FOR MAGNETORESISTIVE MERGED HEADS

This is a division of patent application Ser. No. 09/283,840, filing date Apr. 1, 1999, Method Of Manufacture Of A Composite Shared Pole Design For Magnetoresistive Merged Heads And Device Manufactured Therby, now U.S. Pat. No. 6,393,692 assigned to the same assignee as the present invention.

BACKGROUND OF THE INVENTION

1. Field of the Invention

This invention relates to thin film magnetoresistive (MR) heads and more particularly to magnetoresistive (MR) head structures.

2. Description of Related Art

U.S. patent No. 5,639,509 of Schemmel for "Process for Forming a Flux Enhanced Magnetic Data Transducer" shows a two layered bottom pole structure formed by top shield and the flux enhancement layer. The flux enhancement layer is composed of with a magnetic High Moment Material (HMM) such as FeN and CoNiFe formed over a magnetic Permalloy-Like Material (PLM) top shield layer. A flux enhanced data transducer and method for producing the same in conjunction with Ashared shields on magnetoresistive (MR) read heads (in which substantially between 500 Å–2500 Å of a relatively higher magnetic moment material such as FeN and CoNiFe is added to the upper surface of the shared shield, or bottom write head pole, prior to a magnetic flux containment ion milling operation utilizing the upper pole as a mask) are described. The relatively higher magnetic moment flux enhancement layer may comprise CoNiFe, FeN or similar material which is deposited prior to the formation of the dielectric gap layer. The upper pole may be formed of NiFe deposited on a thin film seed layer of a 1 Å thick layer of a material such as NiFe or "may also comprise FeN or other relatively higher magnetic moment material such as CoNiFe." The flux enhancement layer may then be selectively removed substantially surrounding the upper pole by means of a relatively brief ion milling process in which only on the order of 1,000 Å of the layer need be removed and during which only an insignificant amount of the material removed might be re-deposited on the sides of the upper pole.

U.S. Pat. No. 5,606,478 of Chen et al. for "$Ni_{45}Fe_{55}$ Metal-in-Gap Thin Film Magnetic Head" and U.S. Pat. No. 5,812,350 of Chen et al. for "Metal-in-Gap Thin Film Magnetic Head Employing $Ni_{45}Fe_{55}$" show a pole piece P1 composed of a combination of HMM and LMM materials.

U.S. Pat. No. 5,435,053 of Krounbi et al. for "Simplified Method of Making Merged MR Head" shows a method for making a planarized merged pole.

SUMMARY OF THE INVENTION

With the continuous trend in the magnetic recording industry of increasing of the track density of magnetic recording, the objective of reduction of edge erasure from adjacent track writing becomes increasingly important. Edge erasure, resulting from writing fringe, can decrease the written track width and reduce drive yield by degrading off-track capacity and/or unwanted overwriting of adjacent tracks when writing. The writing fringe field often comes from a dimensional inconsistency and a mismatch of materials near the area where the flux is crowded, i.e. the gap area, of write heads. Recording on high-coercivity media especially requires the heads made of High Moment Material (HMM) for write poles and Permalloy-Like Material (PLM) for magnetoresistive (MR) shields.

Magnetic poles made of materials with a saturation magnetization higher than that of Permalloy are desirable for improving the writability of magnetic recording heads.

We have found that there is a need for a merged magnetoresistive (MR) recording heads with both High saturation Moment Material (HMM) and Permalloy. The HMM material is suitable for recording on high-coercivity media. Permalloy or Permalloy-Like Material (PLM) can function as a good sensor shield.

GLOSSARY

Edge erasure—Erasure by the write head that occurs outside of two edges of the write track.

Writing fringe—Unintended writing along two edges of the desired write track.

Writing fringe-field—the magnetic field outside of the write gap causing inadvertent writing along two edges of the desired write track.

Overwrite—The process of writing on a disk track to erase previously written information while simultaneously writing new data.

Side writing—Unintended writing on two sides of a track. It may adversely affect data recorded on an adjacent track.

HMM—High Moment Material electroplated metals and alloys having high saturation moments or saturation magnetization ($4\pi M_s$) characteristics such as $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

Permalloy—A nickel rich alloy with iron, with a ratio just below 5:1 Ni atoms to Fe atoms, $Ni_{79}Fe_{19}$.

Permalloy Like Material—PLM

PLM—Permalloy Like Material consists of all electroplated metals and alloys having soft-magnetic properties such as Permalloy ($Ni_{79}Fe_{19}$), NiFeCr, NiFeMo, NiFeW, NiFePd, NiFeCu, NiFeCo in which the ratio of nickel atoms to iron atoms is about 5:1 with fewer high magnetic moment iron atoms.

ABS—Air Bearing Surface—pole tips are separated by an air gap at an ABS.

IBE—Ion Beam Etching

A method of manufacturing a magnetic recording head includes the following steps. Form a low magnetic moment first magnetic shield layer over a substrate.

Form a read gap layer with a magnetoresistive head over the first shield layer.

Form a seed layer over the read gap layer.

Form a frame mask with width "W" over the seed layer.

Form a low magnetic moment second magnetic shield layer over the read gap layer over the seed layer.

Form a non-magnetic spacer layer over the second magnetic shield layer.

Form a first high magnetic moment pole layer over the second magnetic shield layer.

Form a write gap layer over the first high magnetic moment pole layer.

Form a second high magnetic moment pole layer over the write gap layer.

Outside of the frame mask perform the step of removing the portions the second magnetic shield layer, the first high magnetic moment pole layer, the write gap layer, the second high magnetic moment pole, and the seed layer.

Preferably, employ ion beam etching to narrow the lower pole layer and the write gap layer to upper magnetic pole width "N" where width "W" is substantially greater than width "N", and employ ion beam etching to pattern the first high magnetic moment pole layer to magnetic pole width "N" in part and flaring the remainder of the first high magnetic moment pole layer towards the width "W" of the second magnetic shield layer. As a result, the upper high magnetic moment pole layer has a narrow width "N", the second magnetic shield layer has a width "W" over the second magnetic shield layer. Narrow the lower pole layer and the write gap layer to upper magnetic pole width "N" where width "W" is substantially greater than width "N", and pattern the first high magnetic moment pole layer to magnetic pole width "N" in part and flaring the remainder of the first high magnetic moment pole layer towards the width "W" of the second magnetic shield layer. This structure is fashioned by using the upper pole as a mask to trim the upper high magnetic moment layer of the shared pole so that the high magnetic moment layer has the same dimension "N" as the top pole and its bottom part is wider with a width "W".

Form a nonmagnetic spacer layer over the low magnetic moment, second magnetic shield layer, and below the lower pole layer.

The low magnetic moment second magnetic shield layer over the read gap layer is formed of a material selected from the group consisting of metals and alloys having soft-magnetic properties including Permalloy, NiFeCr, NiFeMo, NiFeW, NiFePd, NiFeCu, and NiFeCo, and the lower pole layer is formed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

Sputter a PLM nickel-iron seed layer over the read gap layer prior to plating the low magnetic moment second magnetic shield layer.

Another aspect of this invention is the merged magnetic read head/write head structure produced by the above process.

BRIEF DESCRIPTION OF THE DRAWINGS

The foregoing and other aspects and advantages of this invention are explained and described below with reference to the accompanying drawings, in which:

FIG. 2 is a sectional view of a second embodiment of the device of FIG. 1 and FIG. 2 is a section taken along taken along line 2—2 in FIG. 6.

DESCRIPTION OF THE PREFERRED EMBODIMENT

Figure 5:
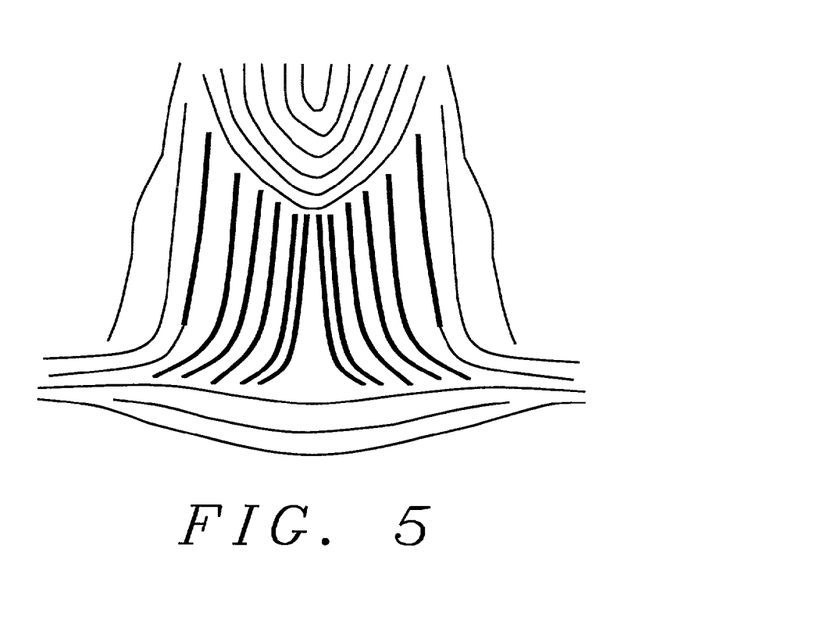
FIG. 5 is a sketch mapped of the stray fields from magnetoresistive (MR) magnetic heads.

Tapping an MFM tip on an Air Bearing Surface (ABS) of energized write heads was carried out to study the stray field of the tip. The stray fields from heads were mapped and studied as indicated by the sketch in FIG. 5. In this study, we concluded that shared pole requirements are as follows:

1. Shared poles require use of HMM materials near the write gap in order to reduce saturation and fringe fields, and
2. Dimensional changes from the write gap to the shared pole should neither be near to the read gap nor near to the write gap.

First Embodiment

Figure 1:
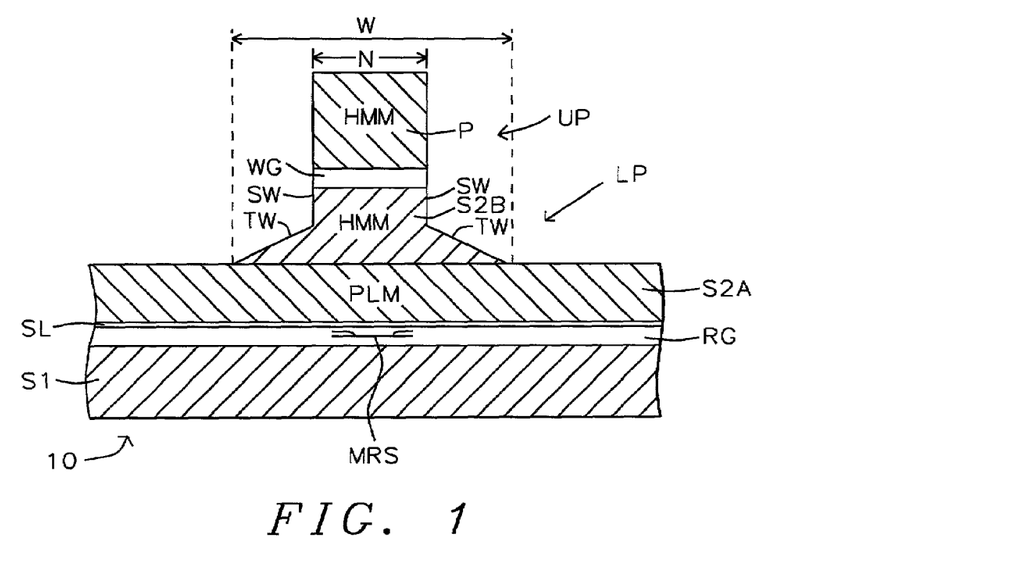
FIG. 1 shows a first embodiment of this invention is providing a merged magnetoresistive (MR) head with a PLM shield layer laminated with an HMM lower pole layer.

The basic structure of a first embodiment of this invention is shown in FIG. 1 which provides a merged magnetoresistive (MR) head 10 with a PLM shield layer S2A laminated with an HMM lower pole layer S2B formed above a shield layer S1. Read gap layers RG composed of a non-magnetic dielectric material are formed over the shield S1 with a magnetoresistive sensor stripe MRS sandwiched within the read gap layer RG, as will be well understood by those skilled in the art.

Figure 2:
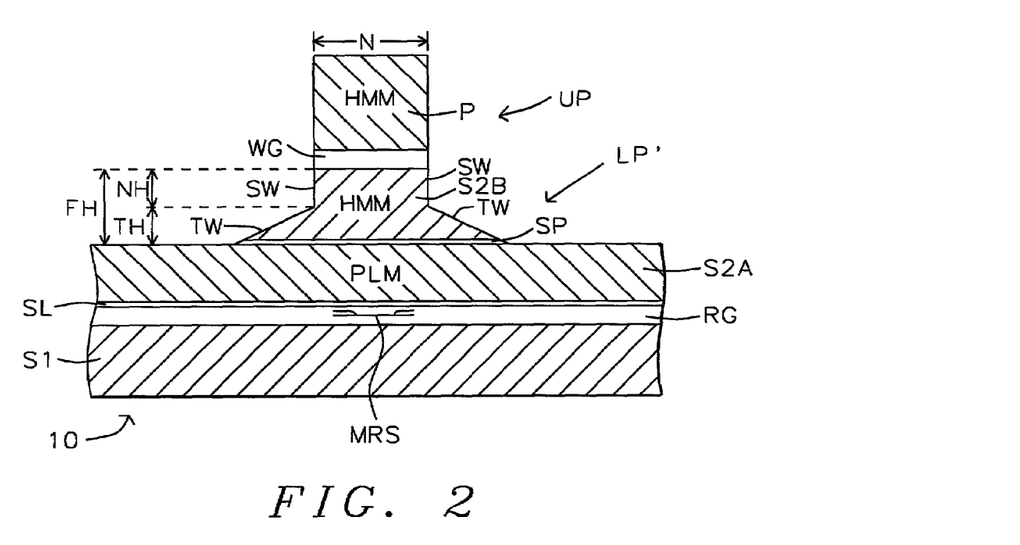

In accordance with this invention, as shown in FIG. 1 and FIG. 2, above read gap layer RG, a seed layer SL is formed on which a shared lower pole LP is formed comprising a pair of laminated layers S2A/S2B. The shared lower pole LP combination is formed by a lower PLM shield layer S2A plated on seed layer SL and an upper HMM lower pole layer S2B plated on the lower PLM shield layer S2A. Thus, layer S2A of the lower pole LP is formed on the top surface of seed layer SL which is formed on the top surface of the read gap layer RG. The HMM lower pole layer S2B of lower pole LP, which comprises the first High Magnetic Moment (HMM) layer S2B, is formed above lower PLM shield layer S2A and it is one of a pair of HMM layers S2A/P which comprise the material of the poles adjacent to the write gap layer WG which is formed on the top surface of HMM layer S2B.

The write gap layer WG is also composed of a non-magnetic dielectric material, which is formed over the HMM layer S2B of the lower pole LP.

The upper pole UP comprises a write head pole P composed of HMM material formed on the surface of the write gap layer WG of the write head. Thus the write gap layer WG is located between the first HMM layer S2B of the lower pole LP and the top, write head pole P.

The two HMM layers of lower pole LP and upper pole UP, including the first HMM layer S2B and writer head pole P, make it possible for the write head to record on high-coercivity magnetic recording media; while at the same time the PLM layer S2A of the shared lower pole LP functions as a good magnetoresistive (MR) sensor shield for the magnetoresistive stripe MRS.

Figure 6:
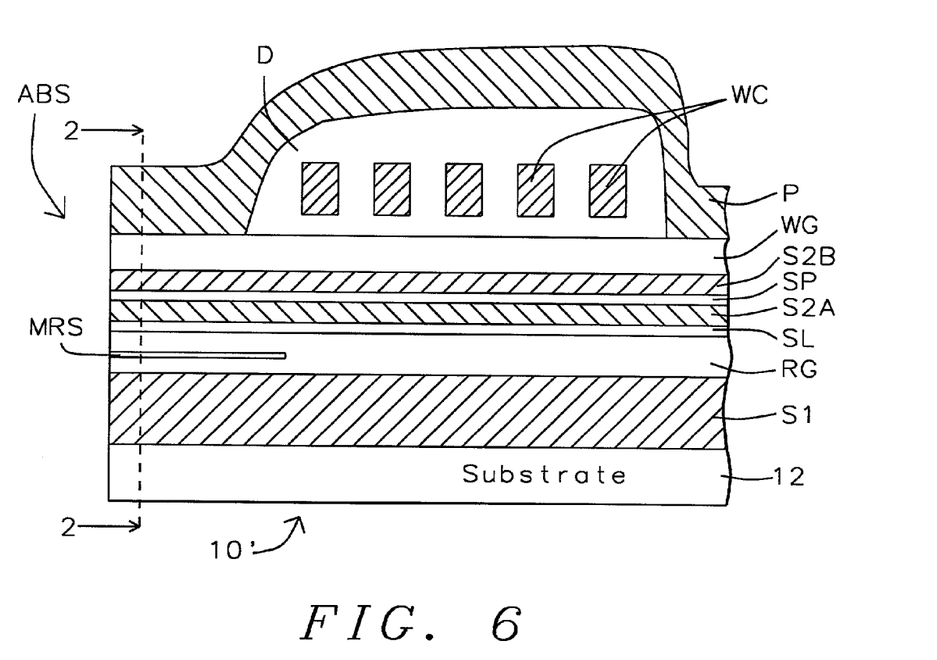
FIG. 6 shows a fragmentary sectional view of a device in accordance with this invention showing the second embodiment of this invention shown in FIG. 2.

As stated above, the top, write head pole UP comprises an HMM layer P with a narrow width "N". The shared pole LP is made of a structure of HMM layer S2B sandwiched with a PLM layer S2A. The shaped, shared pole LP is patterned by a process of Ion Beam Etching (IBE) which improves the dimensional consistency between top pole UP and the shared lower pole LP and the mismatch between the plated PLM layer and the two HMM layers with a width "W" at the base of the HMM layer pole layer S2B. FIG. 6 shows a fragmentary sectional view of a device 10' showing a second embodiment of this invention. FIG. 2 is a sectional view of the device 10' of FIG. 6 taken along line 2–2. FIG. 2 shows a modified head 10 based on the head 10 of FIG. 1 with the lower pole LP' modified to form a layered structure in which the lower PLM shield layer S2A is separated from the HMM lower pole layer S2B by a non-magnetic, dielectric layer SP.

The structure of FIG. 6 shows the write coils WC in a dielectric layer D above the write gap layer WG and below the upper pole P. The remaining layers have been described above in connection with the description of FIG. 1. In FIG. 6, the air bearing surface ABS is shown on the left end of the device 10'. The right end of device 10' is broken away for convenience of illustration.

In the case of the embodiment of FIG. 2, there is a key structural modification comprising separation of HMM layer S2B from the lower PLM, metal shield layer S2A by a non-magnetic spacer layer SP. If a spacer layer SP is provided, as in FIG. 2, before plating HMM lower pole layer S2B, spacer layer SP is plated on top of a metal area on the surface of PLM metal layer S2A. The non-magnetic spacer layer SP allows the HMM/PLM layers S2B/S2A to perform their individual functions freely with reduced magnetic interaction, while remaining in intimate physical proximity (on either surface of layer SP) separated by on the order of only about 75 Å–125 Å or preferably about 100 Å.

In both FIG. 1 and FIG. 2, the HMM lower pole layer S2B has vertical sidewalls SW extending from the top thereof to about half-way down towards the lower PLM, metal shield layer S2A. Then, referring to FIG. 1, the walls flair out from a width "N" laterally forming tapered walls TW with a width "W" at the base where walls TW reach the top surface of PLM metal layer S2A or spacer layer SP. Walls TW are sloped at an acute angle of between about 10° and about 35° that first HMM lower pole layer S2B is of equal width to HMM upper pole layer P thereabove. Referring to FIG. 2, the HMM lower pole layer S2B has a full height FH, and the HMM layer S2B remains at a narrow width N for the height NH which reaches about half way down height FH along the sidewalls SW. Then the HMM lower pole layer S2B flares out from width "N" to width "W" for the tapered height TH. Thus the HMM lower pole layer S2B has a substantial width "W" at the bottom of tapered walls TW, where it is proximate to contact with the PLM layer S2A than the narrow upper pole layer P with width "N". The dimensions shown in FIGS. 1 and 2 are substantially equal and the dimension markings are separated for clarity of illustration with FIG. 2 showing the heights of the portions of lower pole LP'. The lower PLM, metal shield layer 2A and the shield S1 have widths substantially greater than said width "W".

The two examples of embodiments of this invention seen in FIGS. 1. and 2 are layered structures which have been investigated by applicants and which are referred to hereinafter as structure A and structure B.

| Structure A | | |
|---|---|---|

In structure A, the lower pole LP' of FIG. 2 includes the stacked layers as follows:

| PLM | SP | HMM |
|---|---|---|
| 1 µm $Ni_{81}Fe_{19}$ / | 100 Å Cu / | 1 µm $Ni_{45}Fe_{55}Sn_{0.3}$) |

Structure A was made with a 100 Å thick copper (Cu) spacer layer SP between the PLM and HMM layers, as shown in FIG. 2.

| Structure B | |
|---|---|

In structure B, the lower pole LP' of FIG. 1 includes the stacked layers as follows:

| PLM | HMM |
|---|---|
| 1 µm $Ni_{81}Fe_{19}$ / | 1 µm $Ni_{45}Fe_{55}Sn_{0.3}$ |

Structure B had no spacer layer between the PLM and HMM layers, as shown in FIG. 1, but was otherwise identical to Structure A.

Figure 3A:
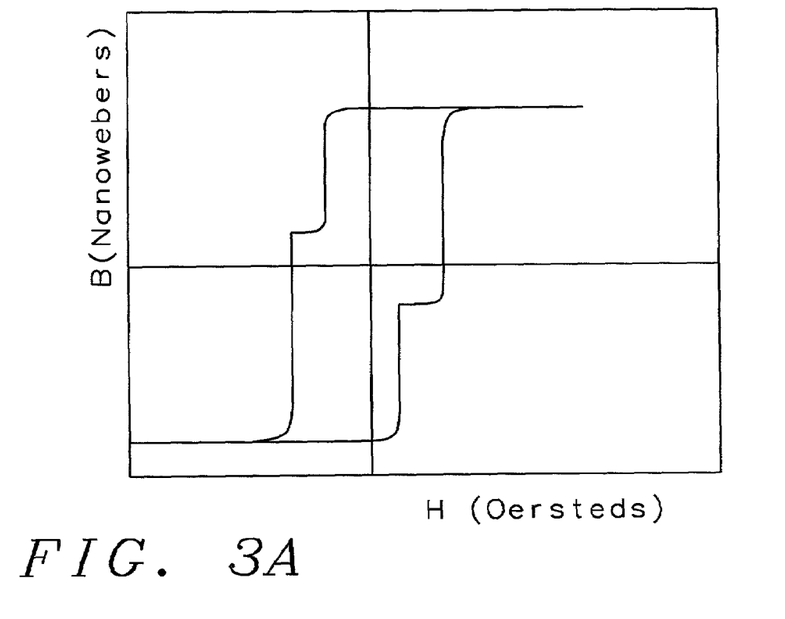
FIGS. 3A and 3B show the results of measurement of easy axis loops which indicate that a Structure B, shown in FIG. 3B has one composite coercivity; whereas a Structure A, shown in FIG. 3A, possesses the coercivities of both materials.
Figure 3B:
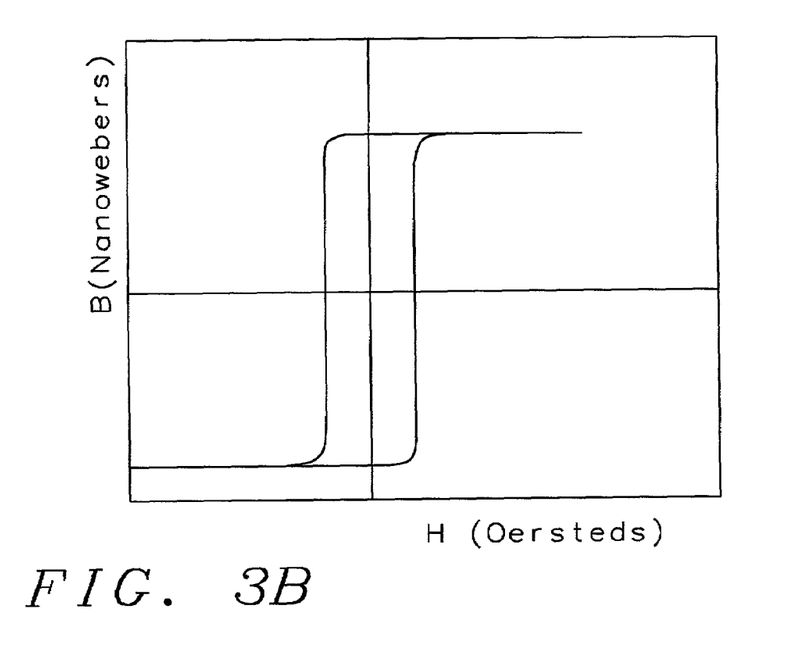

FIGS. 3A and 3B show the results of measurement of easy axis loops which indicate that Structure B, shown in FIG. 3B has one composite coercivity; whereas Structure A, shown in FIG. 3A, possesses the coercivities of both materials.

It is evident that the 100 Å thick nonmagnetic copper spacer layer SP effectively separates the magnetization of the $Ni_{45}Fe_{55}Sn_{0.3}$ layer and the magnetization of the $Ni_{81}Fe_{19}$ layer. The magnetic separation provided by the copper spacer layer SP makes the HMM layer capable of carrying high-intensity flux without adversely disturbing the remanent state of the PLM lower pole layer S2B. This feature is used to build a shared pole in accordance with the embodiment shown in FIG. 2 of this invention.

By partially trimming the structure of head 10 or 10' with an ion-beam, the track width of write poles UP/LP and UP/LP' is self-aligned. Thus unwanted side writing can be minimized further.

PROCESS

Structure A

Electrodeposition

Figure 4A:
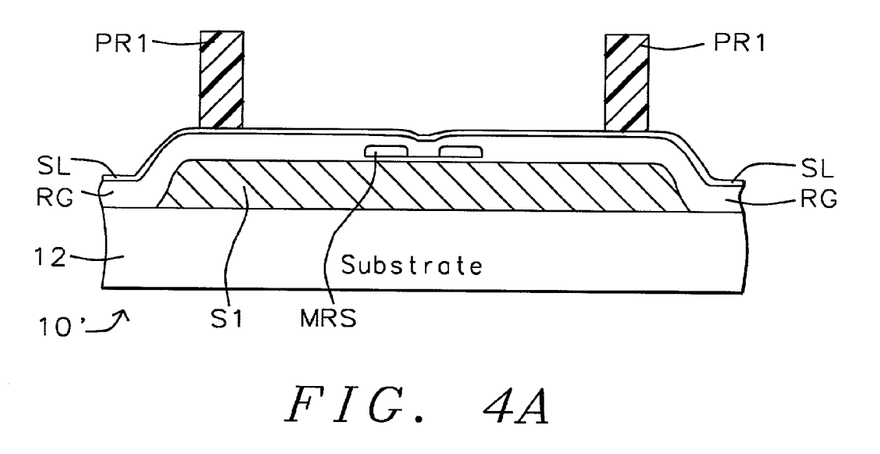
FIG. 4A–4I shows successive steps in a process of manufacturing a device similar to the device of FIG. 2 in accordance with the method of this invention.

1. To build up a structure, a Permalloy seed-layer SL is deposited by sputtering. Referring to FIG. 4A, the device 10'of FIG. 2 is shown in an early stage of manufacture during which the lower shield S1 is formed on a substrate 12. The read gap layer RG is formed above the lower shield and reaches down into contact with the substrate 12 at either end of the lower shield S1. As explained above in connection with FIG. 1, the magnetoresistive sensor stripe MRS is sandwiched within the read gap layer RG. Then, the a metal seed-layer SL is sputtered onto the surface of read gap layer RG and a photoresist frame PR1 is applied to the surface of seed-layer SL by a photolithographic exposure and development process.

Figure 4B:
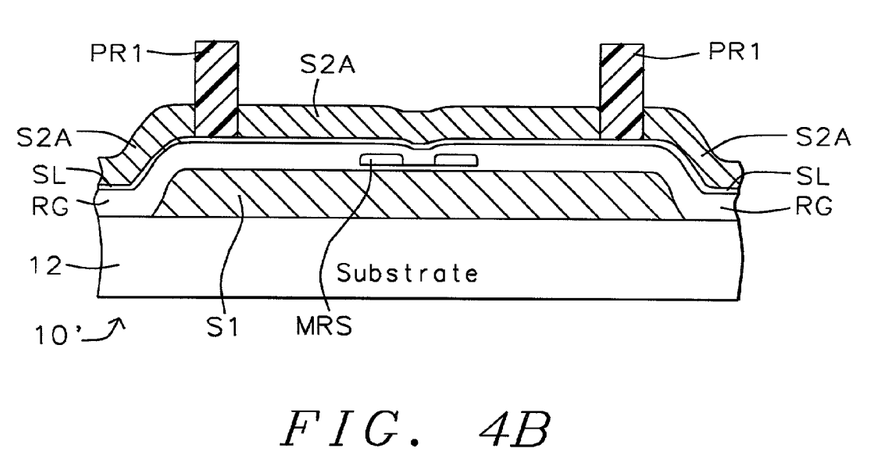

2. Referring to FIG. 4B a lithography process is applied to the device 10' of FIG. 4A to form a shared pole pattern. The Permalloy, lower PLM, metal shield layer S2A has been frame-plated onto seed-layer SL to a thickness of about 1 µm (one micrometer) through the shared pole mask PR1.

By using a sophisticated auxiliary electrode-design (J. ECS, 137, 110–117, (1990)), one can achieve, a thickness variation within ±0.1 µm.

Figure 4C:
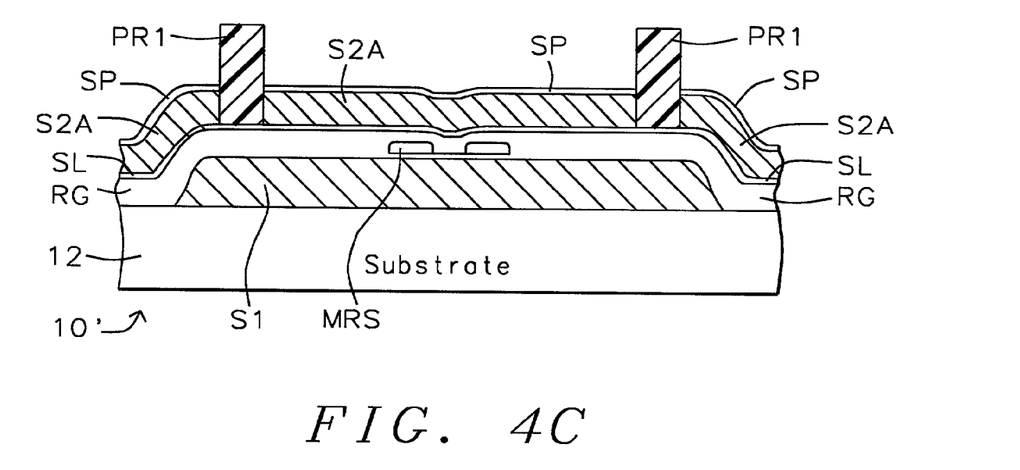

3. Referring to FIG. 4C, the lower, PLM, metal shield layer S2A has been selectively electroplated through the photoresist pattern. The device 10' of FIG. 4B is shown after the step taken at the end of the plating of the lower, PLM, metal shield layer S2A of switching to plating a non-magnetic thin copper spacer layer SP plating with a thickness of about 100 Å.

Figure 4D:
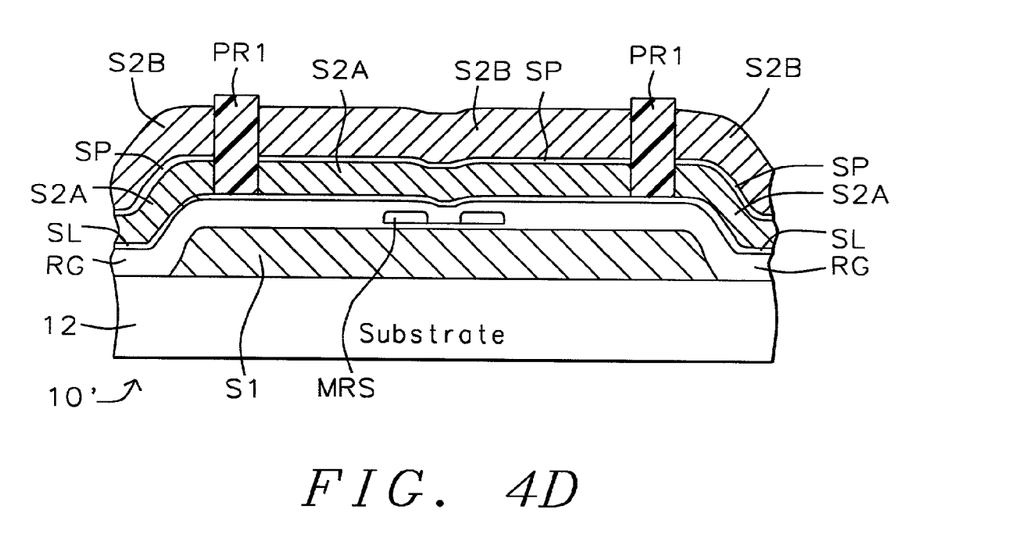

4. Referring to FIG. 4D the device 10' of FIG. 4C is shown after the step was taken at the end of plating of copper spacer layer SP, of switching to forming HMM lower pole layer S2B in a by plating bath (plate second part of shared pole LP in FIG. 1).

Figure 4E:
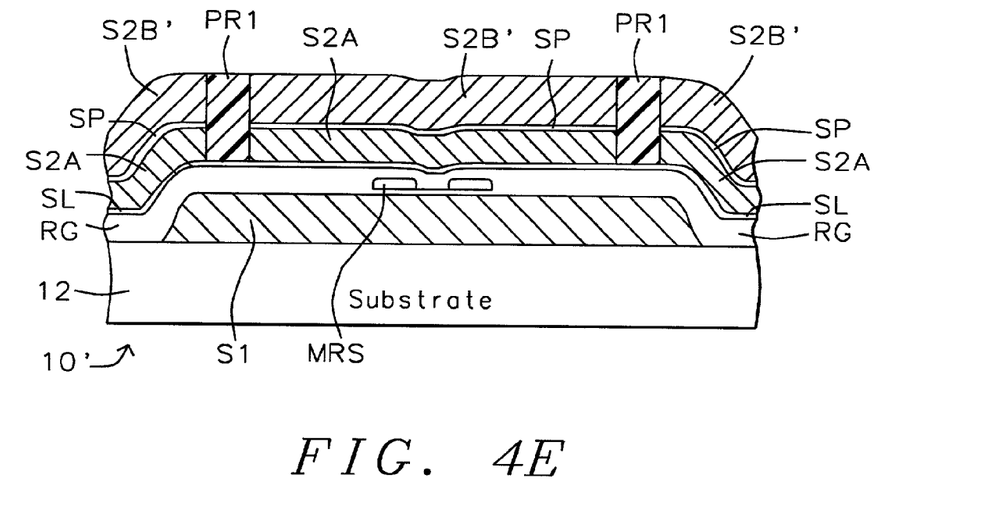

5. Referring to FIG. 4E the device 10' of FIG. 4D is shown after planarization with the photoresist frame PR1 remaining in place planarizing the HMM lower pole layer S2B to form the top shared pole layer S2B' by CMP (Chemical-Mechanical Polishing/Planar-ization). Instead of resist removal, the device 10' has been chemically-mechanically polished.

Figure 4F:
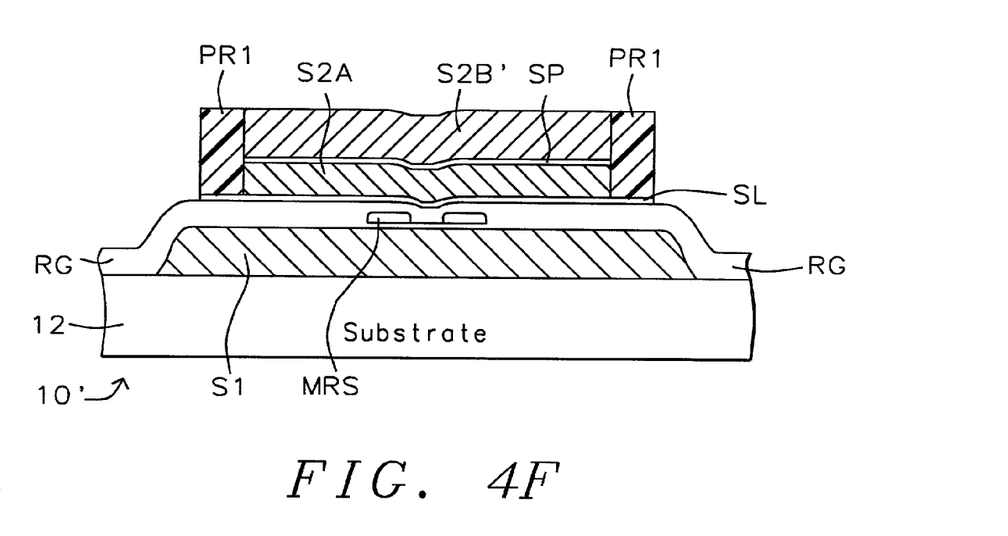

6. Referring to FIG. 4F the device 10' of FIG. 4E is shown after etching away the exposed portions of the field area, lower, PLM, metal shield layer S2A, spacer layer SP, top upper shared pole layer S2B' and seed layer SL outside of the photoresist frame PR1. Due to improvement of head performance, this planarization step is employed for flattening topography resulting from the magnetoresistive (MR) sensor and conductors. With the metal planarization process, it is difficult to have a good uniformity across the wafer. The variation of thickness of upper shared pole layer S2B' can be as large as ±seven tenths of a micrometer (±0.7 μm) which would result in a large thickness variation of upper HMM layer S2B'. The precision of the thickness of upper, shared pole 11 HMM layer S2B' is critical for eliminating saturation, which can cause a large writing fringe field. The metal layer surface of upper shared pole HMM layer S2B' is flattened and the resist PR1 still remains.

Figure 4G:
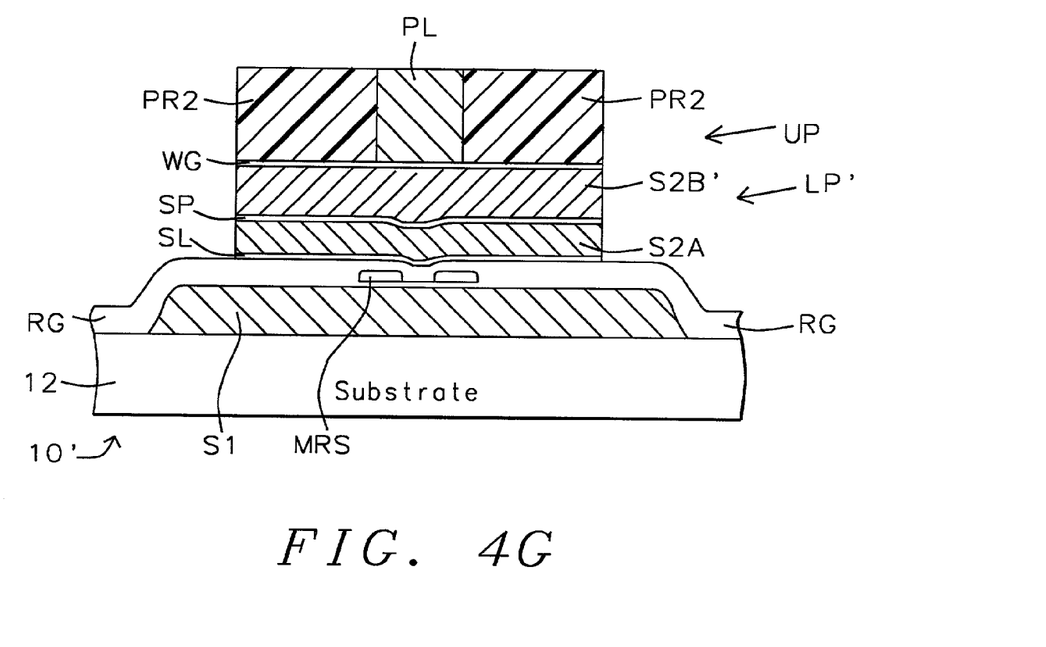
Figure 4H:
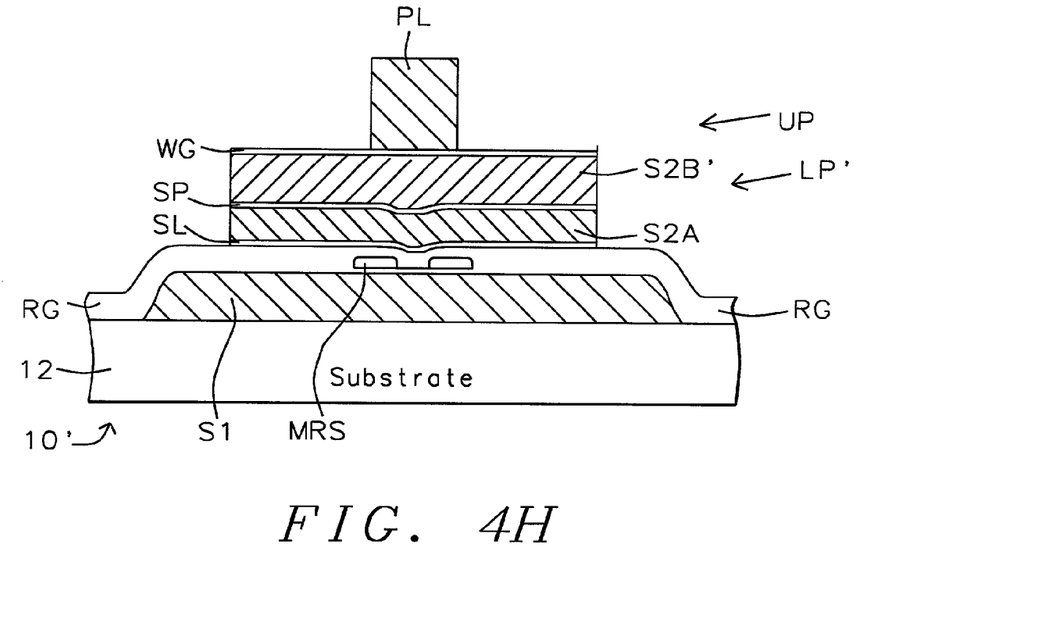

7. Referring to FIG. 4G the device 10' of FIG. 4F is shown after stripping the photoresist frame PR1.

Above the upper HMM layer S2B' are formed the write gap layer WG along with the coil (not shown) and top HMM pole layer PL.

A new photoresist mask PR2 has been formed on top of write gap layer WG with an opening centered above magnetoresistive (MR) sensor stripe MRS. The upper top HMM pole layer PL has been plated into the opening in mask PR2. An excess thickness and width of top upper HMM pole layer PL is used to compensate for Ion-Beam Etching (IBE) which is used in step 8 below to trim the HMM layers P/S2B of device 10'.

Figure 4I:
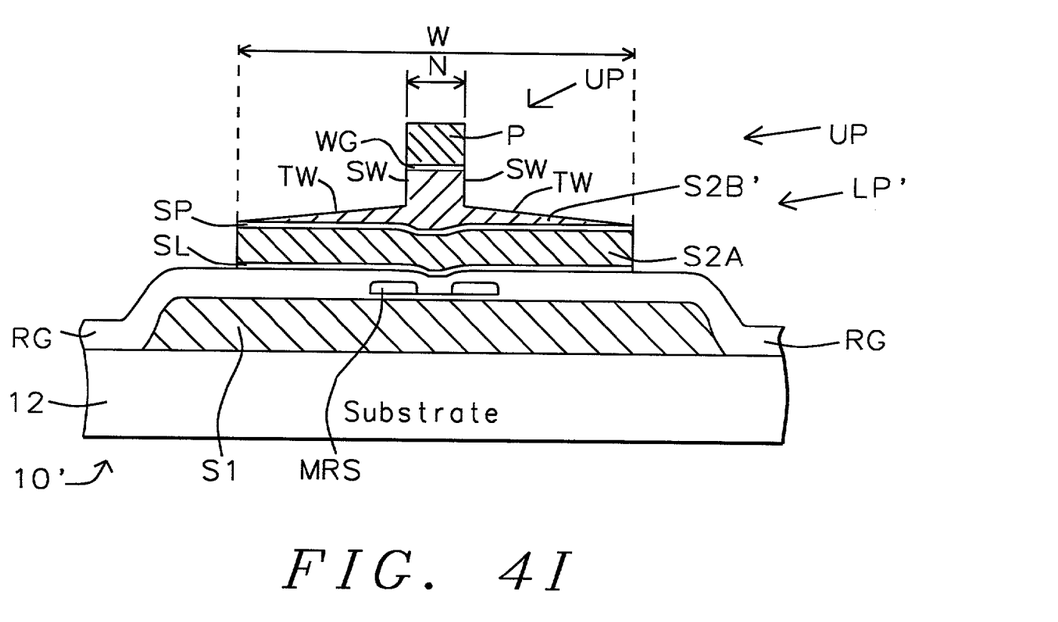

9. Referring to FIG. 4I the device 10' of FIG. 4G is shown after the upper HMM top pole layer PL has been used as a trimming mask and the IBE process has been used to trim the shared pole LP'. The width of the upper HMM top pole layer PL has been narrowed by the ion beam etching process. The trimming time will be defined by the thickness of the HMM layers P and S2B. The ion beam etching is modified in duration as a function of distance from the edge of upper pole UP of width "N" to the edge of the first HMM layer S2B' of the lower pole LP'.

9. Referring to FIG. 4I the device 10' of FIG. 4G is shown after the HMM top pole layer PL has been used as a trimming mask and the IBE process has been used to trim the shared pole LP'. The width of HMM top pole layer PL has been narrowed by the ion beam etching process. The trimming time will be defined by the thickness of the HMM layers S2A and S2B'. The ion beam etching is modified in duration as a function of distance from the edge of upper pole UP of width "N" to the edge of the first HMM layer S2A of the lower pole LP.

The IBE process is operated under computer control by the steps as follows:

Step 1 To mill the write gap layer WG and the HMM layer S2B' with an angle from about 45° to about 35°.

Step 2 To ion mill the redeposited metal from HMM layer S2B' by using a high milling angle.

By partially ion-beam trimming, the inconsistency of the geometry at write gap layer WG can be avoided. The side writing can be further decreased. This design suggests that both material mismatch and track width inconsistency be pushed to the middle layer (between HMM/PLM) of shared pole.

Structure B

In the case of the structure B shown in FIG. 1, the process employed to produce the structure shown was the same except that step 3 was omitted.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

The invention claimed is:

1. A magnetic recording head comprising:
   a merged magnetoresistive read head/inductive write head,
   said write head having a write gap between an upper High saturation Moment Material (HMM) pole and a composite shared pole,
   said read head being located between a shield layer and said composite shared pole,
   said composite shared pole consisting of a Permalloy-Like Material (PLM) layer,
   said PLM layer having a width substantially greater than width "W",
   said PLM layer being laminated with a HMM lower pole layer with tapered sidewalls,
   a joint between said HMM lower pole layer and said PLM layer with said HMM lower pole layer having said width "W" at said joint with said PLM layer and having a width "N" adjacent to said write gap,
   said shield layer and the HMM lower pole layer being substantially wider than said width "W",
   said write head having said upper HMM pole made of HMM material having said narrow width "N", and
   said width "W" is substantially greater than said width "N".

2. A head in accordance with claim 1 wherein said shared pole is a layered structure of said PLM layer, a non-magnetic spacer layer and said HMM lower pole layer with said non-magnetic spacer layer sandwiched therebetween.

3. A head in accordance with claim 1 wherein said PLM layer is composed of a material selected from electroplated metals and alloys having soft-magnetic properties.

4. A head in accordance with claim 1 wherein:
   said PLM layer is composed of a material selected from the group consisting of Permaloy, NiFeCr, NiFeMo, NiFeW, NiFePd, NiFeCu, NiFeCo, and
   said HMM lower pole is composed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

5. A merged read/write magnetic recording head comprising:
- a low magnetic moment (LMM) first magnetic shield layer over a substrate, and a read gap layer with a magnetoresistive head over said first shield layer,
- a shared pole comprising:
  - a) a Permalloy Like Material (PLM) second magnetic shield layer over said read gap layer having a width substantially greater than width "W", and
  - b) a high magnetic moment (HMM) lower pole layer over said second magnetic shield layer having a width "W" at an interface with said HMM lower pole layer,
- said LMM first magnetic shield layer being substantially wider than said width "W",
- a write gap layer over said first HMM pole layer of said shared pole, with said HMM lower pole layer having a narrow width "N" at said write gap layer, and
- an upper pole comprising an HMM pole layer over said write gap layer having said narrow width "N", and
- said width "W" is substantially greater than said narrow width "N".

6. A head in accordance with claim 5 wherein:
said shared pole is a layered structure with said LMM second magnetic shield layer comprising a PLM layer, an intermediate non-magnetic copper spacer layer, and said HMM lower pole layer formed on said non-magnetic copper spacer layer.

7. A head in accordance with claim 6 wherein said PLM layer is composed of a material selected from electroplated metals and alloys having soft-magnetic properties.

8. A head in accordance with claim 6 wherein:
said PLM layer is composed of a material selected from the group consisting of Permalloy, NiFeCr, NiFeMo, NiFeW, NiFePd, NiFeCu, NiFeCo, and
said HMM lower pole is composed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

9. A magnetic recording head comprising:
- a low magnetic moment first magnetic shield layer over a substrate,
- a read gap layer with a magnetoresistive head over said first shield layer,
- a seed layer over said read gap layer,
- a plated low magnetic moment second magnetic shield layer formed on said seed layer, said first and second magnetic shield layer having a width greater than width "W",
- a plated non-magnetic spacer layer with the width "W" over said second magnetic shield layer,
- a plated first high magnetic moment (HMM) pole layer over said second magnetic shield layer formed on said spacer layer having said width W at said spacer layer,
- a write gap layer with a narrow width "N" formed over said first HMM pole layer, and
- a second high magnetic moment upper pole layer over said write gap layer having said narrow width "N" where said width "W" is substantially greater than said narrow width "N".

10. A head in accordance with claim 9 wherein:
said first high magnetic moment pole layer is patterned to magnetic pole width "N" in part; and
the remainder of said first high magnetic moment pole layer flares towards said width "W" of said second magnetic shield layer.

11. A head in accordance with claim 10 comprising:
said low magnetic moment second magnetic shield layer over said read gap layer is formed of a material selected from the group consisting of metals and alloys having soft-magnetic properties including Permalloy, NiFeCr, NiFeMo, NiFeW, NiFePd, NiFeCu, and NiFeCo, and
said lower pole layer is formed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

12. A magnetic recording head comprising:
- a low magnetic moment first magnetic shield layer over a substrate,
- a read gap layer with a magnetoresistive head over said first shield layer,
- a seed layer over said read gap layer,
- a plated low magnetic moment second magnetic shield layer with a width "W" over said read gap layer over said seed layer,
- a plated non-magnetic spacer layer with the width "W" over said second magnetic shield layer,
- a plated first high magnetic moment pole layer over said second magnetic shield layer, a write gap layer with a narrow width "N" over said first high magnetic moment pole layer,
- a second high magnetic moment upper pole layer over said write gap layer having said narrow width "N" where the width "W" is substantially greater than the width "N",
- said first high magnetic moment pole layer being patterned to magnetic pole width "N" in part and the remainder of said first high magnetic moment pole layer flared towards said width "W" of said second magnetic shield layer, and
- a sputtered Permalloy-Like Material (PLM) nickel-iron seed layer over said read gap layer below said plated low magnetic moment second magnetic shield layer.

13. A head in accordance with claim 12 with said first high magnetic moment pole layer patterned to said narrow width "N" in part and flaring the remainder of said first high magnetic moment pole layer towards said width "W" of said second magnetic shield layer.

14. A head in accordance with claim 12 comprising:
said lower pole layer and said write gap layer having been narrowed by ion beam etching to said narrow width "N" where width "W" is substantially greater than width "N",
said first high magnetic moment pole layer having been ion beam etched to said narrow pole width "N" in part and the remainder of said first high magnetic moment pole layer flaring towards said width "W" of said second magnetic shield layer,
said low magnetic moment second magnetic shield layer over said read gap layer is formed of a material selected from the group consisting of metals and alloys having soft-magnetic properties including Permalloy, NiFeCr, NiFeMo, NiFeW, NiFePd, NiFeCu, and NiFeCo, and
said lower pole layer is formed of a material selected from the group consisting of $Ni_{45}Fe_{55}$, $Ni_{45}Fe_{55}Sn$, CoNiFe, CoFeCu, $Ni_{45}Fe_{55}Cr$, and $Ni_{45}Fe_{55}Mo$.

* * * * *